Oct. 12, 1926.

W. J. PINE

METAL WORKING MACHINE

Filed Feb. 13, 1922      3 Sheets-Sheet 1

1,602,448

Wilber J. Pine
INVENTOR.

BY
Erwin, Wheeler & Woolard
ATTORNEYS.

Oct. 12, 1926.

W. J. PINE 1,602,448

METAL WORKING MACHINE

Filed Feb. 13, 1922   3 Sheets-Sheet 2

Wilber J. Pine
INVENTOR
BY Erwin, Wheeler & Woolard
ATTORNEYS.

Oct. 12, 1926.

W. J. PINE 1,602,448

METAL WORKING MACHINE

Filed Feb. 13, 1922   3 Sheets-Sheet 3

Wilber J. Pine
INVENTOR.
BY Erwin, Wheeler & Woodard
ATTORNEYS.

Patented Oct. 12, 1926.

1,602,448

UNITED STATES PATENT OFFICE.

WILBER J. PINE, OF KENOSHA, WISCONSIN.

METAL-WORKING MACHINE.

Application filed February 13, 1922. Serial No. 536,260.

This invention relates to metal working machines and is particularly directed to a power driven hack saw.

In machine shop practice it is customary to shape or form surfaces and unusual contours by means of planers and shapers. During this work a large amount of the material is needlessly wasted, as the stock to be removed has to be gradually cut away, and in addition to this waste of material, time is needlessly spent and energy consumed in effecting this removal. Considerable difficulty has been experienced in obtaining the desired angle of cut, as it is extremely difficult to properly hold the material in a firm and secure manner while allowing it to be subjected to the violent shocks caused by the reciprocating tool.

This invention overcomes the above enumerated difficulties and provides a more efficient mode of operation.

Objects of this invention are, therefore, to provide a machine which wastes a minimum amount of stock, which will make the desired cut without marring the removed stock, which may be accurately and quickly set to cut out the desired angle, and which is extremely rapid in its operation.

Further objects are to provide a power driven saw in which the saw and supporting frame are balanced, in which the pressure applied may be accurately and instantly regulated, in which the saw may be lifted from the work instantly by the operator, and in which provision is made for insuring the desired release before abnormal pressure has been applied.

Further objects are to provide a power driven hack saw which may be started by a simple movement of a single element which automatically effects all of the initial operations prior to the actual cutting, which lifts the saw at each back stroke, which may be set to a predetermined depth of cut and will stop the machine when such depth has been reached, which is so organized that an accurate straight cut will always be made, and in which a constant oil supply may be furnished when desired.

An embodiment of the invention is shown in the accompanying drawings, in which:—

Figure 1:
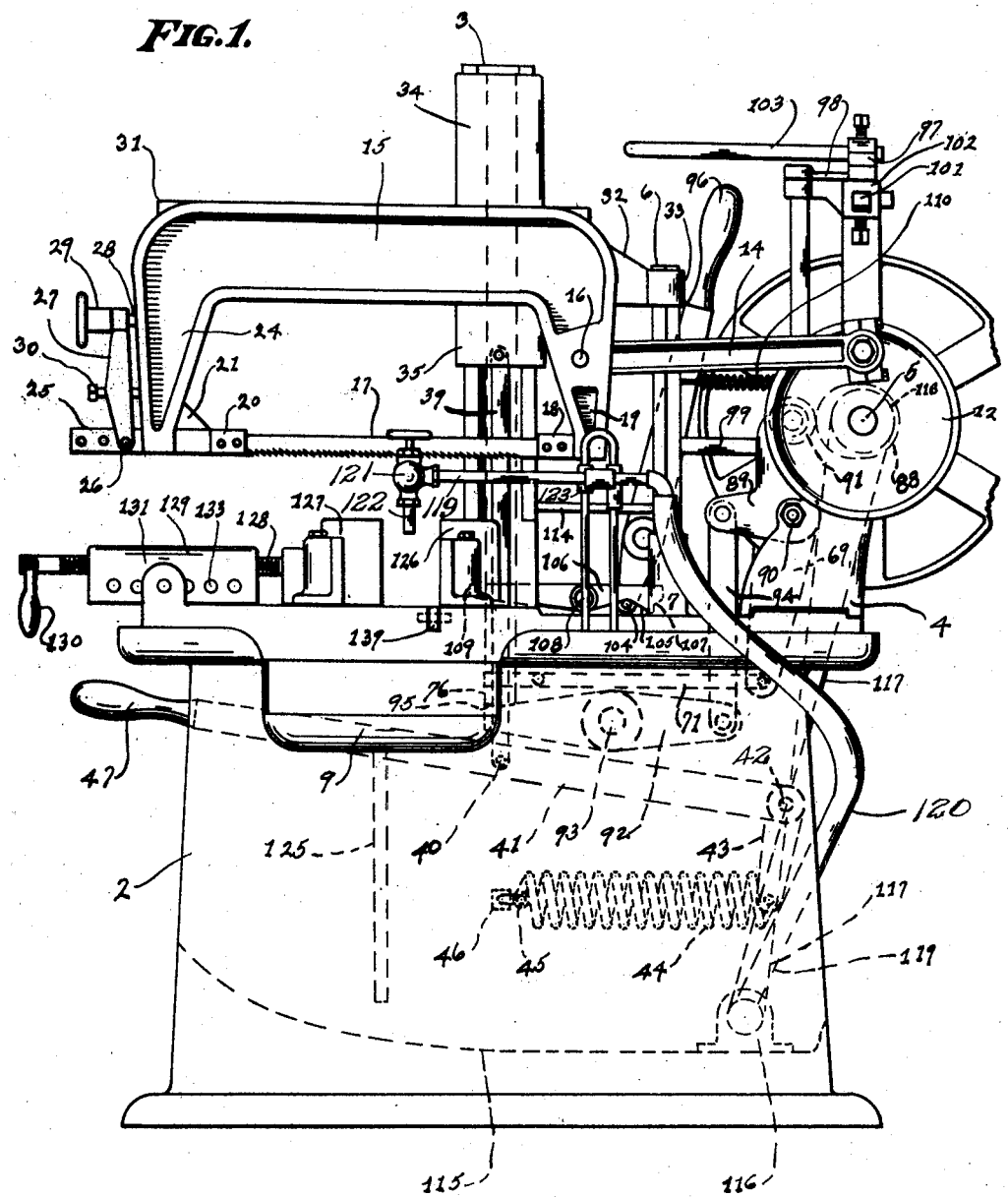
Figure 1 is a side elevation of the complete machine.

The machine comprises a bed plate 1 carried by a hollow base 2. A guiding standard 3 extends upwardly from the bed plate 1, and a second standard 4 extends upwardly from the bed plate adjacent the forward end of the machine and furnishes support for the driving shaft 5. A second guiding standard 6 of rectangular outline extends upwardly from a socketed boss 7 formed in the bed plate 1 of the machine. A bib or apron 8 extends completely around the machine and has a depressed outwardly projecting portion 9 in communication therewith.

The driving shaft 5 carries at one end a fast pulley 10 and a loose pulley 11 adapted to receive the driving belt, (not shown), and at its other end carries a plate 12 upon which is positioned a crank pin 13. A pitman 14 extends from this crank pin to the saw frame 15 and is pivotally connected thereto at 16. The hack saw blade 17 is carried in a lower portion of this frame and may conveniently be secured adjacent its forward end within a socket member 18 secured thereto, by means of bolts or rivets, such socket member being carried by the forward arm 19 of the saw frame. The rear end of the blade is carried within a similar socket member 20 and is secured by bolts or rivets within such member. If desired, this member may have a rearwardly projecting portion provided with an upwardly extending guiding web 21 adapted to slidably fit within a suitable recess 22 forming an extension of the recess 23 formed in the rear downwardly projecting arm 24 of the saw frame. The socket member has a rearwardly extending perforated portion 25 which projects beyond the rear arm 24 of the saw frame, and is secured by means of a pin 26 in any desired position of adjustment to one end of a lever 27, the other end of the lever being enlarged and passing over a screw 28 projecting rearwardly from the saw frame and held in place adjustably by means of the hand nut 29, a suitable set screw 30 furnishing the fulcrum point for the lever.

Figure 2:
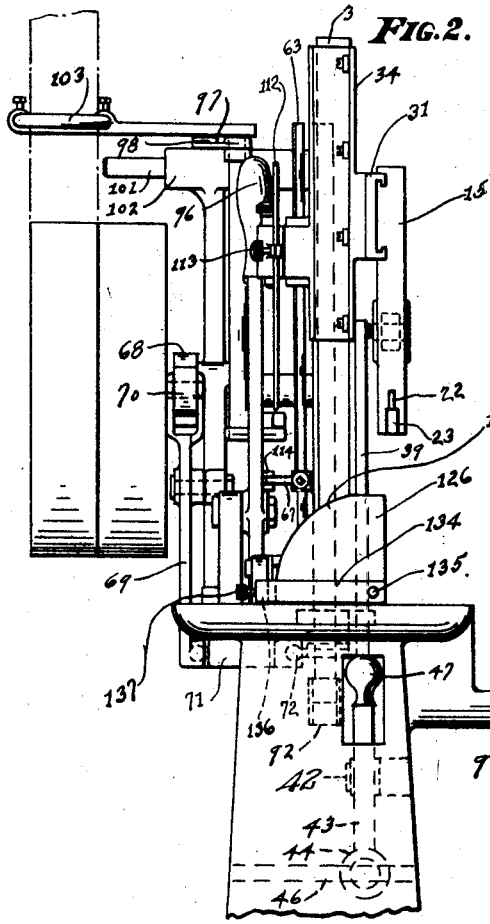
Figure 2 is an end elevation with a portion removed to show the means for angularly positioning the work.

Means are provided for holding the saw frame in a horizontal position while permitting it to reciprocate horizontally and to move vertically. Such guiding may conveniently be secured by means of a guiding plate 31, co-operating as indicated in Figure 2, with the saw frame 15 and extending horizontally to approximately the length of such saw frame and positioned so as to allow about equal relative motion of the frame beyond either end thereof, as may be seen from Figure 1. This guiding plate is provided with an outwardly extending arm 32 having a square socket portion 33 slidably engaging the standard 6. It is also provided with upwardly and downwardly projecting relatively narrow extensions 34 and 35 secured to a trapezoidal guiding sheath 36 adapted to slide upon the correspondingly shaped standard 3. This guiding sleeve has an integrally formed rearwardly extending projecting portion 37, and an inwardly extending rounded projecting portion 38 adapted to co-operate with a correspondingly curved, recessed portion in the rear part of the standard 3. A link 39 extends downwardly from the lower portion 35 of the sliding plate, and is pivotally joined thereto.

The lower end of the link is pivoted at 40 to a lever 41 mounted within the hollow base portion, and itself pivoted upon a shaft 42 to such base portion. This lever 41 is provided with a bell crank arm 43 which is yieldingly drawn inwardly by means of a spring 44 whose other end may conveniently be secured to an eye 45 mounted in a lug 46 formed in the base portion. The outer end of this lever may extend through a slot in the hollow base portion and may be provided with a manipulating handle 47, as shown. It is obvious that the shaft 42 may be extended to the outer side of the base, if desired, and an elongated externally mounted manipulating lever keyed thereto. It is therefore obvious that by manipulating the handle 47, the saw may be raised or lowered manually, and that the spring 44 balances the weight of the saw frame and associated mechanism. The spring 44 may be adapted to maintain the saw normally in its raised position on the guide 3 when the mechanism hereinafter described for actuating the saw frame downwardly has been disconnected therefrom.

Means are provided for mechanically feeding the saw downwardly during each cutting stroke, and such means comprises a vertical feed screw 48, carried within the recessed portion of the vertical standard 3 and passing loosely through the inwardly projecting portion 38 of the guiding sleeve. This screw is provided with continuous threads which have a flat upper surface 49 and a tapered or beveled lower portion 50, as may be seen from reference to Figure 4. A plurality of plungers 51, 52, 53, and 54, are provided with teeth adapted to co-operate with the threads upon the feed screw 48. These plungers are mounted within the extension 37 of the guiding frame and are resiliently pressed inwardly against the screw by means of a series of springs 55, the outer ends of the springs bearing against base members 56 and suitably guided, if desired, by means of pins 57 carried by such base members. These base members and springs are mounted within suitable apertures formed in a member 58 bolted to the extension 37. A pin 59 is mounted to move vertically within a suitable aperture in the member 58, and is provided at its upper end with an outwardly projecting threaded stem 60 engaged by an adjusting knurled thumb screw 61 bearing against the upper end of the member 58. This slidable member 59 is provided with recesses adapted to receive the respective members 56, and it is to be noted from an inspection of Figure 4 that the lower portion of the members 56 are beveled as indicated at 62 and co-operate with correspondingly beveled surfaces forming the bottom of the recesses in the slidable adjusting member 59. It is to be noted that by manipulating the nut 61, the pressure with which the plungers 51 to 54 inclusive, bear upon the feed screw may be controlled. It is to be noted that the thickness of the plungers 51 to 54 is such as to present relatively differently positioned teeth to the threads of the feed screw 48, so that no matter what position the sliding guide sleeve may occupy, the teeth of one of the plungers will always accurately engage the corresponding threads of the feed screw 48.

The pressure that the plungers 51, 52, 53, and 54 exert upon the said screw threads may be regulated by manipulation of the nut 61. Rotation of the nut 61 in either direction will cause a corresponding vertical movement of the pin 59, thus the members 56 will ride upon the slanting faces on pin 59 and move horizontally to increase or decrease the pressure of the springs 55 upon their corresponding plungers. The pressure that the springs 55 exert upon the plungers determines the resistance that such plungers offer to the relative axial movement between the threads thereon and the threads upon said screw. Furthermore, it is obvious that the angular inclination of the threads on the feed screw 48 and plungers will determine the maximum amount of pressure that the plungers must exert to allow slippage between such threads to occur, that is, the greater the angle of the threads the less pressure the plungers must exert, and vice versa.

The law of inclined planes applies and consequently the pressure that the springs 55 must exert upon the plungers must be regulated according to the angularity of the threads.

It is to be noted that the threads upon the feed screw 48, by their peculiar formation, permit yielding, by allowing the teeth of the plungers to slide upwardly along the beveled faces 50 of the threads so that if a saw should encounter a hard portion of the material through which it would not readily pass, it is allowed to exert only a predetermined pressure as determined by the setting of the thumb nut 61; the plungers will be forced backwardly against the springs 55 and will allow a relative slip to occur between the teeth of the plungers and the feed screw threads. It is also to be noted that the saw may be raised from the work at any time by manipulating the handle 47 of the lever 41. However, excessively fast cutting, which would tend to cause the saw to follow a curved or deflected path, is prevented as the upper faces of the threads are flat and hold the saw from excessive downward motion in a positive and efficient manner. When it is desired to freely move the saw upwardly and downwardly, a rod 63, which extends upwardly thru the projecting portion 37 and thru openings 64 formed in the plungers 51, 52, 53, and 54 is slightly rotated so as to cause its projecting cam-like edge 65 to contact with the rear surface 66 of the openings 64 in the plungers, and to withdraw the plungers rearwardly to permit their teeth to disengage the threads of the feed screw 48. This rod is provided with a rocking arm 67 which is operated in a manner hereinafter to be described. From the foregoing description it will be observed that provision has been made for automatically retarding the feed of the saw 17 when such saw encounters a cutting resistance in excess of the maximum resistance which the plungers 51, 52, 53 and 54 offer to relative axial movement between threads of the plungers and the threads of screw 48.

Means are provided for intermittently rotating the feed screw as follows: A cam 68 is mounted upon the driving shaft 5 and cooperates with a cam follower 69 pivoted to the frame of the machine, and provided at its upper end with a roller 70 adapted to travel upon the cam face. The lower end of the cam follower has pivotally joined thereto, by means of a ball and socket joint, a link 71 whose inner end is pivoted in a similar manner, by a ball and socket joint, to a projecting arm 72 of a segmental gear 73. This segmental gear is freely mounted upon a bolt 74 (see Figure 4) upon the end side of the bed plate and meshes with a pinion 75 freely mounted upon the lower end 76 of the feed screw 48, and is therefore given partial rotation as the segmental gear 73 is rocked.

Figure 6:
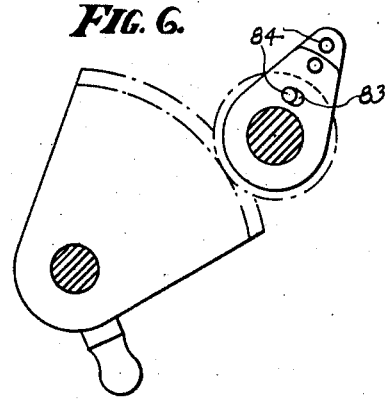
Figure 6 is a detail of the operating mechanism for the feed screw.

A second plate 81, loosely mounted upon the extension 76 of the feed screw 48, is superimposed above the plate 79 for limited rotative movement relative thereto and is provided with an elongated aperture 83 (see Fig. 6). The plate 79 extends radially beyond the second plate 81 and is provided with a pin 84 which extends into the aperture 83 of the second plate to limit the relative movement of such plates. Superimposed above the second plate 81 for rotative movement relative thereto, is a ratchet wheel 77 which is keyed to the end 76 of the screw 48. Pivotally secured to the plate 79 through pin 80 is a dog or pawl 78 which is also pivotally secured to the second plate 81 through pin 82 and is adapted to engage the teeth of the ratchet wheel 77. Mounted upon the projecting end 76 of the screw is a spring 85 secured in position thereon by pin 86 and adapted to maintain the gear 75, and plates 79 and 81, in position axially relative to the ratchet wheel 77. Such spring also transmits to the mechanism just described an upward thrust against the bed plate and a downward thrust of the screw 48 against such bed plate, the screw being provided with a shoulder 87 adapted to rest upon a suitable bearing carried by the bed.

Figure 7:
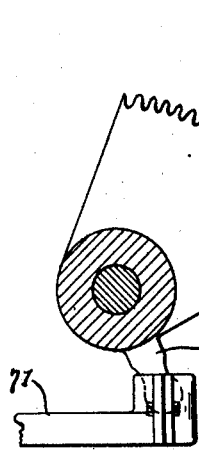
Figure 7 is a further detail thereof.

Thus, when the driving shaft 5 is rotated, the cam follower 69 is actuated to cause the link 71 to oscillate the segmental gear 73 which in turn transmits its movement to the plate 79 through gear 75. The aperture 83 in the second plate permits the plate 79 to move alternately in either direction for limited movement relative to the second plate, but when the pin 84 engages either end of the slot 83 the second plate 81 will be caused to move with the plate 79. When the plate 79 moves in a clockwise direction (see Figs. 6 and 7), it will be permitted to move a limited distance before engaging the second plate 81, and thereby cause the pawl 78 to pivot about the two pins 80 and 82 for withdrawal from the teeth of the ratchet wheel. Upon reversal of the direction of movement of the plate 79, it will move relative to the second plate 81 until the pin 84 engages the other end of the aperture 83. Such reversal of movement will cause the pawl to pivot about the pins 80 and 82 for engagement with the ratchet wheel. When the pawl is engaged with the ratchet wheel, a continued counter-clockwise movement of the gear 75 will cause the feed screw 48 to rotate during such movement and the saw will be fed downwardly as heretofore described. It is, therefore, apparent that a continued oscillation of the gear 75 will cause the saw to be intermittently fed downwardly and the pawl to be retracted from engagement with the ratchet teeth when such saw is held against downward movement, the pawl thus operating silently and not needlessly wearing the ratchet teeth.

In order to avoid the needless wear upon the saw, due to dragging on the back stroke, provision is made for raising the saw and maintaining it in a raised position throughout the entire return stroke. In order to accomplish this, a cam 88 is mounted upon the driving shaft 5 and actuates a bell crank cam follower 89, which latter is pivoted at 90 to the forward standard 4, and which is provided at its upper end with a roller 91 adapted to engage the cam 88. The other arm of the bell crank follower 89 is connected, by means of a pitman 94, with one end of a lever 92, pivoted at 93 within the hollow base portion of the machine. The other end of the lever is concave, as indicated at 95, and engages the rounded bottom portion of the extension 76 of the feed screw 48. As the driving shaft 5 rotates, a cam follower is actuated and rocks the lever 92, thereby causing the feed screw 48 to be raised against action of the spring 85, the collar 87 of such feed screw merely lifting from its seat. The cam is designed to produce a dwell at each extreme position, so that the feed screw 48 remains lifted during the entire back stroke and again rotates and remains in its initial position throughout the entire cutting or working stroke. It is to be noted that the flat tops of the threads of the feed screw will engage the corresponding surfaces of the teeth of the plungers 51 to 54, and thereby raise the guiding frame for the saw and consequently raise the saw clear of the work.

Figure 3:
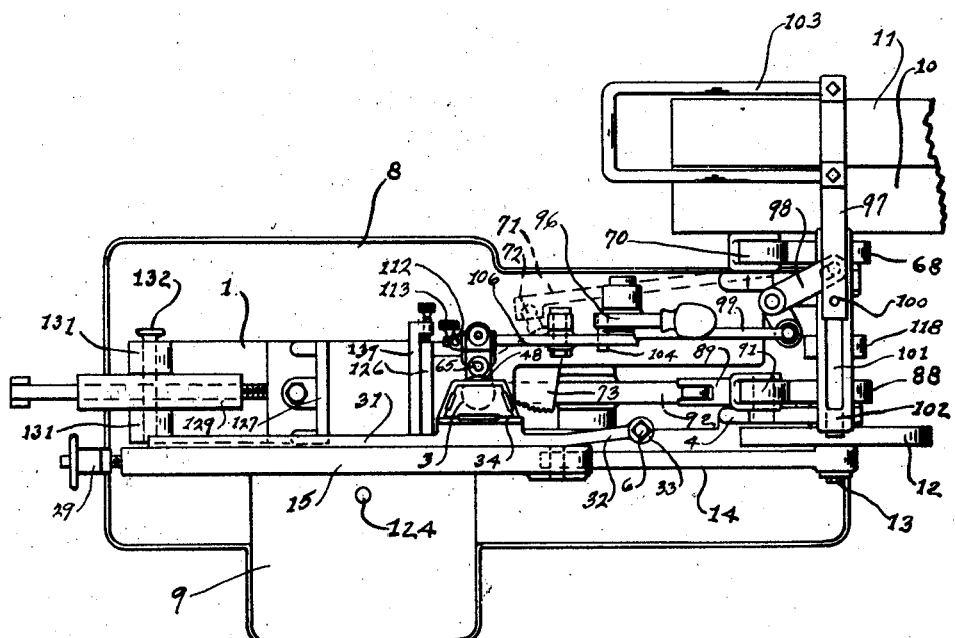
Figure 3 is a plan view.

A starting lever 96 is pivotally mounted upon a lug carried by the bed of the machine, and is connected with a shift bar 97 by means of a slotted bell crank lever 98 and a pitman 99. The bar 97 is bolted, as indicated at 100, to a guiding rod 101, slidably mounted within a slotted frame 102 forming an upper extension of the forward standard 4. The outer end of the bar 97 carries belt guides 103 which shift the belt from the loose pulley 11 to the fast pulley 10 when the lever 96 is rocked to the left, in Figure 3. It is to be noted that when the lever 96 is rocked to the left a pin, 104 carried adjacent its lower end, slides beneath a cam surface 105 of a latch lever 106 and finally seats in the catch or notched portion 107 of such lever. This lever 106 is pivoted at 108 to a lug carried by the bed plate of the machine, and has a free end 109 extending rearwardly of the machine and adjacent the upright 3. A spring 110, attached at one end to the standard 4 and at the other end to the lever 96, tends to direct the lever to its forward position, as indicated in Fig. 1, such motion, however, being prevented by the latch 106.

Figure 4:
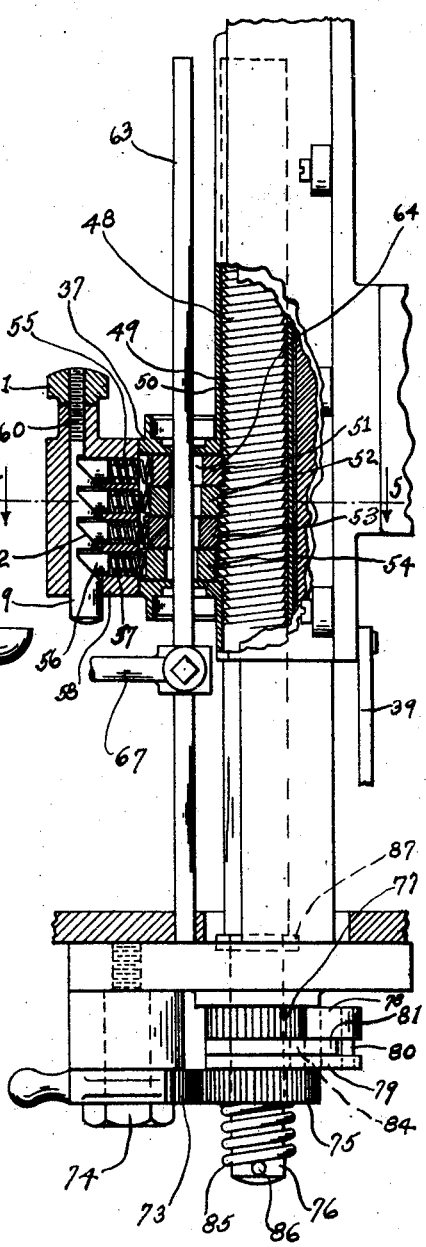
Figure 4 is a fragmentary elevation, partly in section, of the feed screw.
Figure 5:
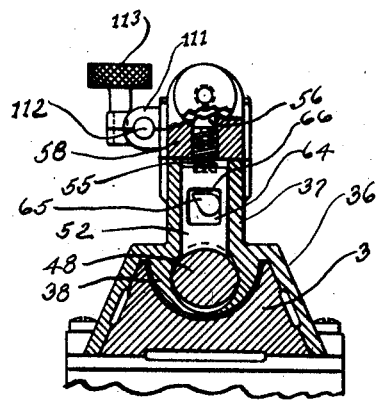
Figure 5 is a section on line 5—5 of Figure 4.

The means for regulating the depth of cut, so that a predetermined distance may be traversed by the saw, comprises a split bracket 111 carried by the member 58, which, as will be seen from a reference to Figures 4 and 5, travels downwardly as a unitary structure with the guiding sleeve 36. A rod 112 extends vertically downwardly through an aperture in this split bracket 111, and may be adjusted to the desired position and clamped in such adjusted position by means of a thumb nut 113. When the saw has traveled downwardly the desired distance, the bottom end of the rod 112 contacts with the free end 109 of the latch 106, thus raising such latch and allowing the control lever 96 to move into inoperative position, thereby stopping the machine.

If it is desired to provide a continuous supply of oil, a catch pan 115 may be mounted within the hollow base of the machine and a pump 116 positioned within such pan, the pump being conveniently driven by means of a belt 117 extending upwardly and around a pulley 118 mounted upon the driving shaft 5. This pump communicates by means of a pipe 119 and hose 120, with a discharge fitting 121 provided with a spout 122 adapted to be positioned over the cut, and held in such position by means of guides 123, secured to the catch pan or apron 8. The return of the oil may be through any desired aperture in the body of the machine, or may be through an aperture 124 in the depressed portion 9 of the apron, such aperture communicating with a downwardly extending pipe 125 and allowing the oil to return to the drip pan after it has been suitably strained in any desired manner.

The means for holding the work in position upon the bed plate comprises a relatively stationary jaw 126, and a relatively movable jaw 127. The movable jaw is pressed inwardly by means of a swivelly attached screw 128, carried within an elongated nut 129, and provided at its outer end with a pivotally connected operating handle 130. The elongated nut is mounted between a pair of lugs 131, and a removable pin 132 detachably joins the nut and lugs as may be seen from Figure 3. If desired, the elongated nut may be provided with a plurality of holes 133, adapted to align with the holes in the lugs 131, so that relatively quick, rough adjustment may be secured and may be followed by accurate clamping through the medium of the screw 128.

The angular positioning of the work between the jaws, and the retention of the work in such position, is secured by means of a member 134 pivoted at 135 to the relatively stationary jaw 126. The outer end of the member 134 is provided with a laterally projecting portion 136 overhanging the outer surface of the stationary jaw 126 and provided with a knurled set screw 137. The adjacent face of the stationary jaw is curved in the arc of a circle, as indicated at 138, and is preferably graduated, such graduations not being shown. A convenient and satisfactory manner of positioning the member 134, is secured by mounting such member within a slot or recess 139 in the bed plate, so that it may be moved down into such bed plate with its upper surface flush with the upper edge thereof.

If it is desired to have the work contact directly with the bed plate, the set screw 137 is loosened and the member 134 rocked downwardly out of the way into the bed plate. However, when it is desired to support the work angularly with reference to the bed plate, the member 134 is moved to the desired angle and locked in position by means of the set screw 137. The work is supported upon this member and is clamped between the movable and stationary jaws of the vise—the member 134 furnishing a firm, secure support for the work and preventing its working loose while in its angular position, as so frequently happens in shapers and similar machines.

It will be noted that the saw may at all times be manually raised from the work, but in order to allow it to be manually moved downwardly into engagement with the work or into the desired proximity thereto, the cam-shaped rod 63 (see Figures 2 and 4) is connected by means of its crank arm 67 with the lever 96 by means of a pitman 114, so that when such lever is moved to operative position, the cam-shaped surface 65 of the rod 63 is rocked out of engagement with the rear faces 66 of the openings within the plungers 51 to 54 inclusive, and such plungers are allowed to move inwardly, thereby causing their teeth to co-operate with the threads upon the feed screw 48. It is to be particularly noted that an accurate, straight cut is produced by this machine, as the downward feed of the saw is positively controlled by the feed screw, and as such saw is accurately guided by the guiding plate 31. For instance, if it is desired to make a slanting cut through an outer surface of a piece of work, the normal lateral deflection of the saw does not occur, as the saw is gradually fed into the work and is allowed to remove only a limited quantity of the material at the initiation of the cut, as it is withheld from violent contact with the work by the flat top threads of the feed screw 48. Also the exact pressure that will be exerted by the saw may be predetermined, as the thumb nut 61 (see Figure 4) accurately controls the pressure of the teeth of the plungers against the beveled faces of the threads and consequently controls the downward pressure exerted by the saw upon the work. If the saw, for any reason, should tend to bind, as for example, when it encounters unusually hard spots in the material, the beveled faces of the threads allow the co-operating bevel faces of the plungers to slide past, against the action of the springs 55, thereby preventing breaking of the saw.

It is also to be noted that the teeth of the saw are extended toward the right of the machine, as shown in Figure 1, and that the lever 92 lifts the feed screw to thereby lift the saw clear of the work during each stroke to the left, that is to say, during each return or non-working stroke of the saw.

It is to be noted that the saw may be manually positioned by means of the handle 47, either upwardly or downwardly while the machine is at rest, and may always be lifted from the work by the manipulation of this handle, even while the machine is in operation. It is also to be noted that by moving a single lever, that is to say, the control lever 96 to the left of the plate, the belt is shifted to the fast pulley and the plungers are simultaneously allowed to move inwardly into engagement with the threads of the feed screw.

I claim:

1. A power driven saw comprising a driving shaft, means for connecting said shaft with a source of power, means for controlling such connection and comprising a manually movable member, a saw, a frame therefor, means for connecting said driving means with said frame to impart a reciprocatory motion to said saw, an intermittently operated feed screw for lowering said frame, movable teeth operatively associated with said frame, and means for moving said teeth into and out of engagement with said feed screw, said means being operatively connected with said manually movable member, whereby when said machine is started, said teeth will operatively engage said feed screw.

2. A power driven hack saw comprising a frame work, a driving shaft therein, a control lever for coupling said shaft with a source of power, a spring tending to move said lever to inoperative position, a latch adapted to hold said lever in operative position against the action of said spring, a saw blade operatively connected with said drive shaft and adapted for reciprocation, means for feeding said blade downwardly, and means adapted to operate when said blade has arrived at a predetermined point to drop said lever and cause the cessation of the operation of the machine.

3. A power driven saw comprising a shaft, a crank mounted thereon, a saw operatively connected with said crank to receive reciprocatory motion therefrom, a frame for guiding said saw, a feed screw for operating said frame and having flat topped threads with beveled lower surfaces, teeth carried by said frame and adapted to cooperate with said threads, and means for operating said feed screw to lower said saw, whereby said saw is positively supported and fed and allowed to yield when excessive pressure is placed upon said saw.

4. In a device of the character described, a guiding frame, a tool provided with a carrier slidably supported by the frame, a feed screw and a yieldable toothed member connected with the carrier and normally meshing operatively with said screw for carrier propulsion, said member being adapted for automatic change of position relative to said screw when a predetermined pressure is exerted by the tool, whereby to relieve said carrier of propulsive force.

5. In a device of the character described, a guiding frame, a tool provided with a carrier slidably supported from the frame, a feed screw, and a member normally in operative threaded engagement with the screw, said screw and member being adapted for automatic change of relative position of engagement when a predetermined pressure is exerted by the tool.

6. In a device of the character described, a guiding frame, a tool slidably supported from the frame, a feed screw member, a nut member normally in threaded engagement with the screw member, and means for producing relative rotation between said members, said tool being connected with one of said members to be actuated thereby, said members being adapted for automatic change of relative position of engagement when a predetermined pressure is exerted by the tool upon the material to be worked.

7. In a device of the character described having a work supporting bed, a guiding frame extending laterally of the bed, and a tool mounted on the frame for movement laterally of said bed, the combination with a screw journaled in the frame and bed, of a member associated with said tool and adapted for threaded engagement with the screw and for movement radially thereof, means for rotating said screw, a cam for moving said member radially of the screw, a spring actuated lever for automatically operating said cam to move said member radially away from the screw, latch mechanism for retaining said cam and lever in position of disengagement with the member, said member being adapted for automatic engagement with the screw, and means associated with the tool for releasing said latch mechanism, whereby to disengage the screw and member when the tool has moved toward said bed a predetermined distance.

8. In a metal working machine, the combination with a guiding frame, of a tool mounted on the frame and slidable longitudinally thereof, a screw, a member adapted for threaded engagement with the screw, said screw and member being adapted for relative rotative movement for sliding said tool longitudinally of the frame and the member being adapted for movement radially of the screw, spring means for resiliently maintaining the member in engagement with said screw, power transmitting means for rotating said screw, a spring actuated cam for moving said member out of engagement with the screw, latch mechanism for holding said cam inoperative, and a trip associated with the tool and adapted to release said latch mechanism, whereby the movement of the tool longitudinally of the frame will cease.

9. In a device of the character described, the combination with a guiding frame, of a tool carrier mounted on the frame for longitudinal travel thereon, a feed screw, a member adapted for threaded engagement with the screw, said feed screw and member having threads adapted for positive engagement in one direction of relative axial movement and for yieldable engagement in the other direction of relative axial movement, said member being adapted for disengagement with the screw, means for disengaging said member from said screw, and spring actuated means adapted to automatically return the tool carrier to its normal position on the frame when the screw and member are disengaged.

10. In a device of the character described having a frame and a tool carrier, the combination with a feed screw, of a member adapted for threaded engagement with the screw, said feed screw and member having threads adapted for positive engagement in one direction of relative axial movement and for yieldable engagement in the other direction of relative axial movement, spring means for holding said member in yieldable engagement with the screw, and adjustable means for varying the pressure at which the member will yield.

11. In a device of the character described, having a work supporting table and a tool for performing an operation upon the work supported thereon, a feed screw and a feed member for actuating said tool toward said work, said feed screw and feed member being adapted for positive engagement in one direction of relative axial movement and for yieldable engagement in the other direction of relative axial movement, whereby the feed of the tool toward the work may be automatically relieved when such tool exerts a predetermined pressure thereon.

12. In a device of the character described, having a work supporting table and a tool for performing an operation upon such work, a feed screw for actuating said tool toward said work and provided with a bearing end projecting from said table, and means for imparting to said screw an intermittent rotary movement, said means comprising an oscillatory gear segment, a gear meshing therewith and revoluble mounted upon the bearing end of said screw, a ratchet wheel keyed to said end, a pawl pivotally carried at one end by said gear, and a plate interposed between said gear and ratchet wheel and secured to said gear for limited rotative movement relative thereto, said pawl being pivotally secured intermediate its ends to said plate, whereby to withdraw the pawl from engagement with the teeth of the ratchet wheel when the gear is rotated in a direction opposed to the direction of rotation of the screw.

13. In a device of the character described having a feed screw, means for imparting an intermittent rotary movement to said screw, said means comprising an oscillatory toothed member, a gear meshing with the toothed member and adapted for rotative movement relative to the screw, a ratchet wheel secured to the screw, and a pawl, said pawl having a fixed pivotal connection to said gear and second pivotal connection therewith adapted for limited movement relative thereto, whereby to withdraw the pawl from contact with the ratchet wheel in one direction of rotation of the gear and to place the pawl in operative engagement with the ratchet wheel in the other direction of rotation of the gear.

14. In a device of the character described, a tool carrier, a supporting standard therefor, said tool carrier being adapted for longitudinal movement on said standard, and a feed screw for actuating said carrier, said feed screw being provided with a positive connection with the carrier in one direction of relative axial movement and with a yieldable connection therewith in the other direction of relative axial movement, whereby the maximum feeding pressure of the screw may be predetermined.

15. In a device of the character described, a tool carrier, a supporting standard therefor, said tool carrier being adapted for longitudinal movement on said standard, and a feed screw for actuating said carrier, said feed screw being provided with a positive connection with the carrier in one direction of relative axial movement and with a yieldable connection therewith in the other direction of relative axial movement, said yieldable connection being adapted for adjustment, whereby the maximum pressure under which such screw will actuate the carrier may be predetermined.

16. In a device of the character described, a tool carrier, a supporting standard therefor, said tool carrier being adapted for longitudinal movement on said carrier, a feed screw for actuating the carrier and having a bearing in the standard, a plurality of feed members adapted for threaded engagement with the screw and each independently movable radially thereof, said screw and members being provided with threads adapted to positively engage in one direction of relative axial movement and to yieldably engage in the other direction of relative axial movement, each of said members being adapted to successively come into full engagement with the screw as the other of said members yield in their respective engagements with the screw.

17. In a device of the character described, a tool carrier, a supporting standard therefor, said tool carrier being adapted for longitudinal movement on said carrier, a feed screw for actuating the carrier and having a bearing in the standard, a plurality of feed members adapted for threaded engagement with the screw and each independently movable radially thereof, said screw and members being provided with threads adapted to yieldably engage, each of said members being adapted to come into full engagement with the screw as the other of said members yield in their respective engagements with such screw.

18. In a device of the character described, a tool carrier, a supporting standard therefor, said tool carrier being adapted for longitudinal movement on said standard, a feed screw for actuating said carrier in one direction, and a screw actuated device connected with said carrier, said device being adapted to release said screw for independent rotation when a predetermined amount of resistance is offered to carrier movement and to engage said carrier automatically when the resistance falls below the predetermined amount, whereby the carrier may remain motionless indefinitely until the resistance to its movement becomes normal.

19. In a device of the character described, a tool carrier, a supporting standard therefor, said tool carrier being adapted for longitudinal movement on said standard, a feed screw for actuating said carrier in one direction, said feed screw being provided with a resiliently yieldable connection therewith, the resistance to yielding movement of said yieldable connection being adapted for adjustment, whereby the maximum pressure under which such screw will actuate the carrier may be predetermined.

20. In a device of the character described, the combination of a feed screw and nut element normally in operative mesh therewith and mounted for relative yielding movement, said screw and element being provided with threads adapted for mutual interaction to produce relative propulsion in the direction of the axis of said screw and under excessive resistance to such propulsion to produce said relative yielding movement.

21. In a device of the character described, the combination with a screw, of a plurality of radially yieldable nut elements provided with threads complementary to the threads of the screw, said screw being adapted to propel said elements, and the resistance to yielding movements of said elements being so proportioned to the normal resistance to the propulsive effect of the screw that said elements will yield radially only when the resistance to the propulsive effect of said screw is excessive.

22. In a device of the character described, the combination with a screw having a thread with an axially inclined bearing surface, of a succession of nut segments disposed in an axial series adjacent said screw and independently yieldable radially therefrom, said segments being normally progressively variant from a position of full mesh with said screw, said segments being mounted for bodily propulsion by said screw and adapted to yield independently upon the occurrence of excessive resistance to such propulsion, whereby when one of said segments has yielded the next consecutive segment of the series will come into full mesh with the screw.

23. In a device of the character described, the combination with a screw having a thread with an axially inclined bearing surface, of a succession of nut segments disposed in an axial series adjacent said screw and independently yieldable radially therefrom, said segments being normally progressively variant from a position of full mesh with said screw, said segments being mounted for bodily propulsion by said screw and adapted to yield independently upon the occurrence of excessive resistance to such propulsion, whereby when one of said segments has yielded the next consecutive segment of the series will come into full mesh with the screw, together with means operative to disconnect all of said segments simultaneously from mesh with said screw.

24. In a device of the character described, the combination with a screw and a frame element supported for relative rotative and axial travel, of a radially yieldable nut segment mounted in said frame element, said screw and segment having complementary teeth with axially inclined bearing surfaces, and means for resiliently opposing the yielding of said segment, said means being set to permit yielding movement of the segment only when excessive resistance is offered to relative axial movement between said screw and said frame element, and the resistance of said means to the yielding of said segments being proportioned to the angular inclination of the bearing surfaces of the threads of said screw and segment to permit said screw to thrust said segment radially when the opposition to said relative axial travel becomes excessive.

25. In a device of the character described, the combination with a screw and a frame element mounted for mutual relative rotative and axial travel, said screw being provided with a thread having an axially inclined bearing surface, of an axial series of radially yieldable nut segments provided with threads complementary to the threads of said screw, and springs opposing the radial yielding movement of said segments with a force so proportioned to the angular inclination of the bearing surfaces of said threads as to offer greater resistance to the radial thrust of said screw on said segments than the normal resistance offered to relative axial movement between said screw and said element.

26. In a device of the character described, the combination with a screw and a frame element mounted for mutual relative rotative and axial travel, said screw being provided with a thread having an axially inclined bearing surface, of an axial series of radially yieldable nut segments provided with threads complementary to the threads of said screw, and springs opposing the radial yielding movement of said segments with a force proportioned to the angular inclination of the bearing surfaces of said threads as to offer greater resistance to the radial thrust of said screw on said segments than the normal resistance offered to relative axial movement between said screw and said element, said segments being progressively increasingly deviant from axial positions for the full mesh of their respective threads with the threads of the screw, and the combined deviation of said segments from positions for full mesh as aforesaid being substantially equal to the pitch distance between threads of said screw, whereby when one of said segments is thrust radially, as by excessive resistance to relative axial movement between said screw and said element, the next consecutive segment will be advanced to a position for full operative mesh between its threads and that of the screw.

27. In a device of the character described, the combination with a screw and a frame element mounted for mutual relative rotative axial travel, said screw being provided with a thread having one substantially radial surface and one axially inclined surface, of an axial series of radially yieldable nut segments provided with threads complementary to the threads of said screw, and springs opposing the radial yielding movement of said segments with a force so proportioned to the angular inclination of the bearing surfaces of said threads as to offer greater resistance to the radial thrust of said screw on said segments than the normal resistance offered to relative axial movement between said screw and said element.

28. In a device of the character described, the combination with a screw and a frame element mounted for mutual relative rotative and axial travel, said screw being provided with a thread having one substantially radial surface and one axially inclined surface, of an axial series of radially yieldable nut segments provided with threads complementary to the threads of said screw, and springs opposing the radial yielding movement of said segments with a force proportioned to the angular inclination of the bearing surfaces of said threads as to offer greater resistance to the radial thrust of said screw on said segments than the normal resistance offered to relative axial movement between said screw and said element, said segments being progressively increasingly deviant from axial positions for the full mesh of their respective threads with the threads of the screw, and the combined deviation of said segments from positions for full mesh as aforesaid being substantially equal to the pitch distance between threads of said screw, whereby when one of said segments is thrust radially, as by excessive resistance to relative axial movement between said screw and said element, the next consecutive segment will be advanced to a position for full operative mesh between its threads and that of the screw.

29. In a device of the character described, the combination with a screw and a frame element mounted for mutual relative rotative and axial travel, said screw being provided with a thread having an axially inclined bearing surface, of an axial series of radially yieldable nut segments provided with threads complementary to the threads of said screw, and springs opposing the radial yielding movement of said segments with a force so proportioned to the angular inclination of the bearing surfaces of said threads as to offer greater resistance to the radial thrust of said screw on said segments than the normal resistance offered to relative axial movement between said screw and said element, said springs being provided with seats adjustable to vary the resistance to the radial yielding of the segments.

WILBER J. PINE.